(12) United States Patent
Lu et al.

(10) Patent No.: US 10,437,197 B2
(45) Date of Patent: Oct. 8, 2019

(54) 3D DISPLAY DEVICE AND METHOD

(71) Applicant: LEYARD OPTOELECTRONIC CO., LTD., Beijing (CN)

(72) Inventors: Changjun Lu, Beijing (CN); Zhihao Wang, Beijing (CN); Le Yang, Beijing (CN); Boyang Liu, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 47 days.

(21) Appl. No.: 15/871,680

(22) Filed: Jan. 15, 2018

(65) Prior Publication Data

US 2018/0356767 A1    Dec. 13, 2018

(30) Foreign Application Priority Data

Jun. 9, 2017   (CN) .......................... 2017 1 0436903

(51) Int. Cl.
*G03H 1/04* (2006.01)
*H04N 13/351* (2018.01)
(Continued)

(52) U.S. Cl.
CPC ......... *G03H 1/0465* (2013.01); *G03H 1/2205* (2013.01); *H04N 13/351* (2018.05);
(Continued)

(58) Field of Classification Search
CPC .... H04N 13/31; H04N 13/305; H04N 13/363; H04N 13/275; H04N 13/302;
(Continued)

(56) References Cited

U.S. PATENT DOCUMENTS 5,465,175 A * 11/1995 Woodgate .......... G02B 27/2214
359/463
5,771,121 A * 6/1998 Hentschke ......... G02B 27/0093
359/463
(Continued)

OTHER PUBLICATIONS

Extended Search Report dated Sep. 4, 2018 for Application No. EP 18 15 3403, 10 pages.
(Continued)

*Primary Examiner* — William R Alexander
*Assistant Examiner* — Balram T Parbadia
(74) *Attorney, Agent, or Firm* — Knobbe, Martens, Olson & Bear, LLP

(57) ABSTRACT

Three-Dimensional (3D) display device and method are disclosed. The device can include: a Light-Emitting Diode (LED) display, configured to display an image; a light path control structure including a multilayer pinhole type structure, configured to control emitting directions of light paths of the image to form 3D light field information, wherein multiple groups of pinhole arrays are arranged on each layer of the pinhole type structure; and a holographic function screen, configured to perform diffusion imaging on the 3D light field information to form a 3D image, wherein the LED display, the light path control structure and the holographic function screen are sequentially configured. The technical problems of the related art are solved.

13 Claims, 6 Drawing Sheets

(51) Int. Cl.
*G03H 1/22* (2006.01)
*G03H 1/02* (2006.01)

(52) U.S. Cl.
CPC ............... *G03H 2001/0212* (2013.01); *G03H 2001/0473* (2013.01); *G03H 2001/2213* (2013.01)

(58) Field of Classification Search
CPC .... H04N 13/315; H04N 13/32; H04N 13/351; H04N 13/117; H04N 13/122; H04N 13/286; H04N 13/344; H04N 13/349; H04N 13/354; H04N 13/359; H04N 2013/0081; H04N 5/7408; H04N 5/7491; G02B 27/2214; G02B 27/225; G03H 2001/2213; G03H 1/0465; G03H 1/04; G09F 19/12; G09F 19/14
See application file for complete search history.

(56) References Cited

U.S. PATENT DOCUMENTS

| | | | | |
|---|---|---|---|---|
| 6,481,849 B2* | 11/2002 | Martin | ............... | G02B 27/2214 353/7 |
| 6,533,420 B1* | 3/2003 | Eichenlaub | ........ | G02B 27/2214 353/7 |
| 7,215,356 B2* | 5/2007 | Lin | ......................... | H04N 13/31 348/51 |
| 2008/0018732 A1* | 1/2008 | Moller | ................. | H04N 13/211 348/51 |
| 2010/0277576 A1* | 11/2010 | Fattal | ..................... | H04N 5/222 348/54 |
| 2010/0302136 A1* | 12/2010 | Arcuri | ............... | G02B 27/0093 345/156 |
| 2015/0002645 A1* | 1/2015 | Moller | ................. | H04N 13/305 348/56 |

OTHER PUBLICATIONS

Balogh, et al., "Holovizio 3D Display 1-10 System", 3DTV Conference, 2007, IEEE, PI, May 1, 2007, pp. 1-4, XP031158140.

* cited by examiner

3D DISPLAY DEVICE AND METHOD

CROSS-REFERENCE TO RELATED APPLICATION

This application claims the benefit of the Chinese Application No. 201710436903.8, filed on Jun. 9, 2017, which is hereby incorporated by reference in its entirety.

TECHNICAL FIELD

The disclosure relates to the field of three-dimensional (3D) display, and particularly to a 3D display device and method.

BACKGROUND

A 3D light field display technology is considered as one of most promising technologies in the field of 3D display. In the 3D light field display technology, a real and remarkable glasses-free 3D display effect can be achieved and an image can be performed in real-time.

A structure of a current display device adopting a light field display technology of an ordinary-display is shown in FIG. 1, and a basic principle of the current display device is that: the device is based on a light screen with small holes and an ordinary display, an image displayed in the display may be coded by a computer to obtain light field display units with an m×n resolution, then a direction and intensity of each light emitted from the light field display units may be controlled by open holes of the light screen, that is, an array formed by the light field display units obtained by modulation in a coding manner is displayed on a display screen, the array is demodulated by the small holes with specific optical parameters in a space domain, and formed light information is mutually superimposed to obtain spatial light field information of a target object. Human eyes are able to receive the spatial light field information to fit a natural form of the target object, so that an observer is able to observe an object image in a real 3D effect without glasses.

A schematic diagram illustrating formation of a spatial light field by light field display units of a display device through small holes in a related art is shown in FIG. 2. A resolution determined by a coding manner determines the number of viewpoints provided by the spatial light field. When a sub-image array formed by the light field display units includes m rows and n columns and each light field display unit corresponds to an open hole, the number of the viewpoints of the formed light field is m×n, that is, m viewpoints form horizontal light field information, and n viewpoints form vertical light field information. Therefore, such a technology may form parallaxes in both horizontal and vertical directions to achieve a spatial full-parallax 3D effect. The 3D effect and feeling of depth in the horizontal and vertical directions are positively correlated to the number of respective viewpoints.

However, the abovementioned current ordinary-display-based 3D light field display technology has the following shortcomings. (1) A very high requirement is made on the resolution of the display, or it is difficult to achieve the 3D effect, the current light screen has a very limited light control capability, and a resolution and pixel pitch of a current mainstream display are insufficient to provide a sufficient pixel number and fineness for imaging. For the two factors, the light field display units formed by adaptive coding by virtue of the current light field display technology are low in resolution, the formed image includes small numbers of viewpoints in the horizontal direction and the vertical direction, and it is difficult to achieve an obvious 3D effect. Particularly when the current technology is applied to a Light-Emitting Diode (LED) display with very large pixel sizes and pitches, a formed image may make an observer obviously feel pixel particles, which makes the shortcoming more obvious and causes more serious influence on a watching experience. (2) The loss of the light information luminance is high, and imaging luminance is low. For controlling the directions of the lights of the light field display units as accurately as possible, it is necessary to reduce structure sizes of the small holes of the light screen to block most of the lights, which causes a very low overall light transmittance of the light screen and a very dark final 3D image. Once external ambient light gets slightly strong, the watching experience may be seriously influenced.

For the abovementioned problems, there is yet no effective solution at present.

SUMMARY

Embodiments of the disclosure provide a 3D display device and method, so as to at least solve the technical problems of the related art.

According to an aspect of the embodiments of the disclosure, a 3D display device is provided, which sequentially includes: an LED display, configured to display an image; a light path control structure including a multilayer pinhole type structure, configured to control emitting directions of light paths of the image to form 3D light field information, wherein multiple groups of pinhole arrays are arranged on each layer of the pinhole type structure; and a holographic function screen, configured to perform diffusion imaging on the 3D light field information to form a 3D image, wherein the LED display, the light path control structure and the holographic function screen are sequentially configured.

In an example embodiment of the disclosure, the pinhole type structure is a light screen, the multiple groups of pinhole arrays are arranged on the light screen, and each group of pinhole array includes multiple pinholes; and the image includes multiple light field display units, each light field display unit includes multiple rows of LED pixels and multiple columns of LED pixels, and each light field display unit corresponds to a pinhole array.

In an example embodiment of the disclosure, all the pinholes in the pinhole arrays are arranged in a slash.

In an example embodiment of the disclosure, when a shape of a pinhole is an ellipse, a parameter of the light path control structure includes:

$$W_p = \frac{D}{D+l} \cdot \varepsilon_h \cdot p, \text{ and}$$

$$W_b = \left(m - \frac{D}{D+l} \cdot \varepsilon_h\right) p,$$

where $W_p$ represents a horizontal open hole size of the pinhole, $W_b$ represents a horizontal distance between two pinholes in the same row in two adjacent pinhole arrays, D represents a distance between a watching plane and the pinhole type structure, l represents a distance between an LED display screen and the pinhole type structure, $\varepsilon_h$ represents a duty ratio of a horizontal direction of a luminous part in the LED pixel in the light field display unit, p represents values of a length and width of the LED pixel in the light field display unit, and m represents a pitch between two layers of the multilayer pinhole type structure.

In an example embodiment of the disclosure, a parameter of the light path control structure includes:

$$H_b + H_p = p, \text{ and}$$

$$H_p = \varepsilon_v \cdot p,$$

where $H_b$ represents a vertical distance between two adjacent pinholes in the pinhole arrays, $H_p$ represents a vertical open hole size of the pinhole, $\varepsilon_v$ represents a duty ratio of a vertical direction of the luminous part in the LED pixel in the light field display unit, and p represents values of a length and width of the LED pixel in the light field display unit.

In an example embodiment of the disclosure, a parameter of the light path control structure includes:

$$H_b = 0, \text{ and}$$

$$H_p = p,$$

where $H_b$ represents a vertical distance between two adjacent pinholes in the pinhole arrays, $H_p$ represents a vertical open hole size of the pinhole, and p represents values of a length and width of the LED pixel in the light field display unit.

In an example embodiment of the disclosure, the parameter of the light path control structure includes:

$$\tan\alpha = \frac{b}{p},$$

where $\alpha$ represents an included angle between a vertical direction and the slash formed by all the pinholes in the pinhole array, b represents a horizontal distance between two adjacent pinholes in the pinhole arrays, and p represents values of a length and width of the LED pixel in the light field display unit.

In an example embodiment of the disclosure, a parameter of the holographic function screen includes:

$$\phi_x = \tan\left(\frac{B_x}{2d}\right), \text{ and}$$

$$\phi_y = \tan\left(\frac{B_y}{2d}\right),$$

where $B_x = (W_b + W_p) \cdot \cos\alpha$, $$B_y = \frac{(H_b + H_p)}{\cos\alpha},$$

$\phi_x$ represents a diffusance of the holographic function screen in an x direction, $\phi_y$ represents a diffusance of the holographic function screen in a y direction, d represents a distance between the holographic function screen and the light path control structure, $W_p$ represents a horizontal open hole size of the pinhole, $W_b$ represents a horizontal distance between two pinholes in the same row in two adjacent pinhole arrays, $H_b$ represents a vertical distance between two adjacent pinholes in the pinhole arrays, $H_p$ represents a vertical open hole size of the pinhole, and $\alpha$ represents a included angle between a vertical direction and the slash formed by all the pinholes in the pinhole array.

In an example embodiment of the disclosure, a shape of the pinhole is an ellipse, a round or a rectangle.

According to another aspect of the embodiments of the disclosure, a 3D display method is further provided, which is applied to the abovementioned 3D display device and includes that: an image is displayed through an LED display; emitting directions of light paths of the image are controlled to form 3D light field information through a light path control structure with a multilayer pinhole type structure, wherein multiple groups of pinhole arrays are arranged on each layer of the pinhole type structure; and diffusion imaging is performed on the 3D light field information to form a 3D image by a holographic function screen.

In the embodiments of the disclosure, the emitting directions of the light paths of the image are controlled to form the 3D light field information through the light path control structure including the multilayer pinhole type structure, and diffusion imaging is performed on the 3D light field information to form the 3D image through the holographic function screen. The light path control structure with the multilayer pinhole type structure including the multiple groups of pinhole arrays is able to accurately control the emitting directions of the light paths, and a formed light field not only implements formation of many viewpoints of a horizontal light field, but also meets a low-crosstalk condition, thereby implementing a horizontal light field with an ultrahigh resolution and an obvious horizontal parallax and finally achieving a remarkable 3D light field display effect. The holographic function screen is able to further multiplex the light field information to improve a monocular resolution, and perform secondary optical parallel demodulation processing on the light field information emitted by the multilayer pinhole type structure to rapidly image the 3D light field information and further assist in imaging of human eyes. A feeling of depth of the 3D image is further improved, so that a better 3D effect is achieved, a 3D display purpose is achieved, a real 3D light field display effect with many viewpoints, an ultrahigh resolution, low crosstalk and a large field angle is achieved, a watcher is not required to wear any piece of visual aid, and may watch for a long time without feeling tired and dizzy, and the 3D effect, the feeling of depth and an immersive effect are remarkably improved. Therefore, a watching experience is greatly improved, and the technical problems of poor 3D effects in the related art are further solved.

BRIEF DESCRIPTION OF THE DRAWINGS

The drawings described here are adopted to provide a further understanding to the disclosure, and form a part of the disclosure. Schematic embodiments of the disclosure and descriptions thereof are adopted to explain the disclosure and not intended to form improper limits to the disclosure. In the drawings.

DETAILED DESCRIPTION OF THE EMBODIMENTS

Figure 1:
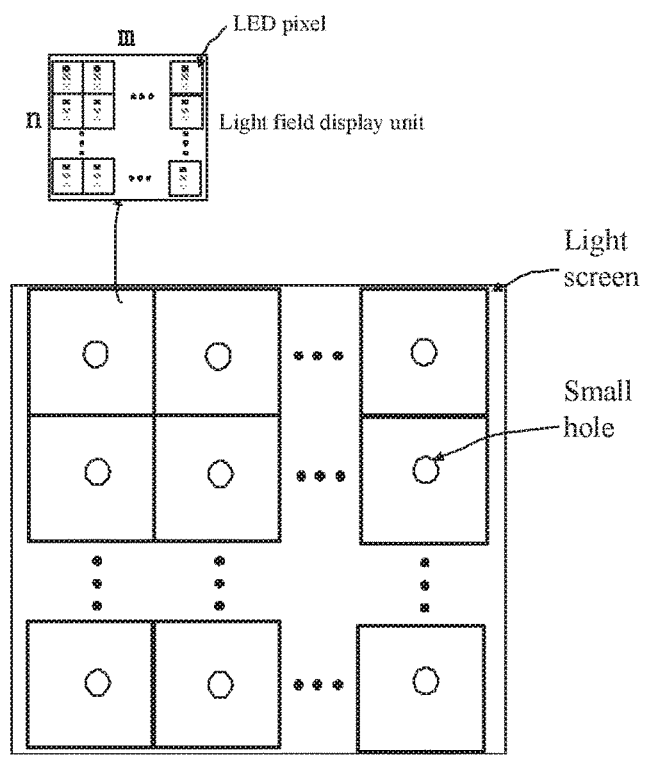
FIG. 1 is a schematic diagram of an ordinary-display-based display device according to the related art.
Figure 2:
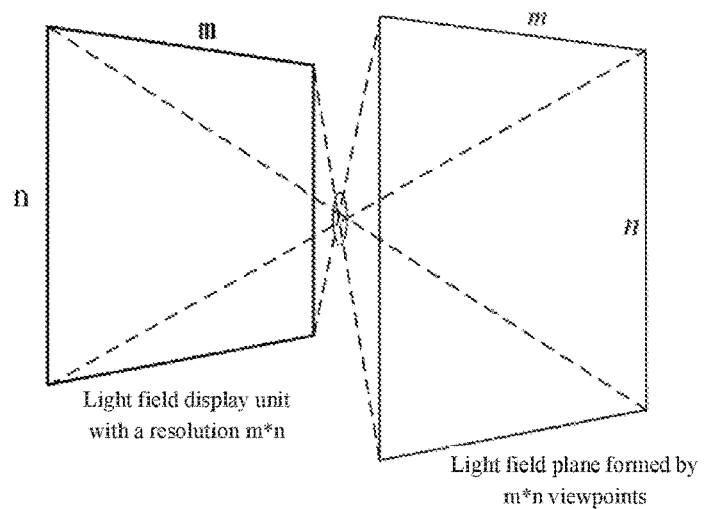
FIG. 2 is a schematic diagram of forming a spatial light field for display by a display device shown in FIG. 1.

In order to make the solutions of the disclosure understood better by those skilled in the art, the technical solutions in the embodiments of the disclosure will be clearly and completely described below in combination with the drawings in the embodiments of the disclosure. Obviously, the described embodiments are not all embodiments but only part of embodiments of the disclosure. All other embodiments that may be obtained by those skilled in the art on the basis of the embodiments in the disclosure shall fall within the scope of protection of the disclosure.

It is important to note that terms "first", "second" and the like in the specification, claims and drawings of the disclosure are adopted not to describe a specific sequence or order but to distinguish similar objects. It should be understood that data used like this may be interchanged under a proper condition for implementation of the embodiments of the disclosure described here in a sequence except those shown or described here. In addition, terms "include" and "have" and any transformation thereof are intended to cover non-exclusive inclusions. For example, a process, method, system, product or equipment including a series of steps or units is not limited to those steps or units which are clearly listed, but may include other steps or units which are not clearly listed or intrinsic to the process, the method, the product or the equipment.

Technical terms involved in the disclosure are interpreted as follows.

Light field: spatial light information distribution formed by many viewpoints and restoring an original form of an object.

Horizontal light field: spatial light information distribution formed by many viewpoints, restoring an original form of an object in a horizontal direction and forming a horizontal parallax.

Parallax: multiple slightly different images obtained by shooting the same scene with a 3D camera are called as parallax images, and a combination of two-dimensional display information presented by these parallax images is called as a parallax.

Horizontal/vertical parallax: multiple slightly different images obtained by shooting the same scene in a horizontal/vertical direction with a 3D camera are called as parallax images, and a combination of two-dimensional display information presented by these parallax images is called as a horizontal/vertical parallax. A full parallax refers to that the shot images have both horizontal parallax information and vertical parallax information.

Viewpoint: two-dimensional light information obtained by observing an object from a certain angle.

Visual area: light field information in a periodic distribution is formed in a space by controlling emitting directions of lights, and such periodic light field information is a visual area.

Field angle: a visual range angle at which a visual angle is observed at an optimal watching distance designed by a system.

Pitch: a horizontal width of a period of a periodic structure of a light control device is a multiple of a horizontal width of a pixel.

Light field display unit: a logical combination formed by a plurality of specific LED pixels, configured to perform image coding to finally determine the number of viewpoints of a 3D light field.

Light field display unit array: an array formed by a plurality of light field display units.

Holographic function screen: a two-dimensional optical film material prepared by virtue of an optical holographic process and having secondary optical parallel demodulation processing and multiplexing functions.

Diffusance: a maximum angle by which a light is diffused after passing through a holographic function screen.

Embodiment 1

Figure 3:
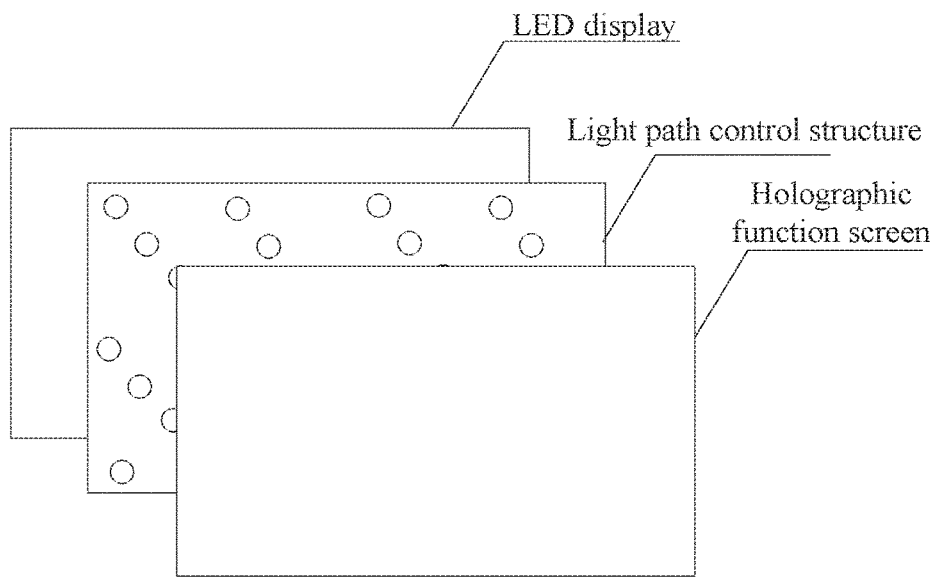
FIG. 3 is a schematic diagram of a 3D display device according to an embodiment of the disclosure.

According to some embodiments of the disclosure, a product embodiment of a 3D display device is provided. FIG. 3 is a 3D display device according to an embodiment of the disclosure. As shown in FIG. 3, the device includes: an LED display, configured to display an image; a light path control structure including a multilayer pinhole type structure, configured to control emitting directions of light paths of the image to form 3D light field information, wherein multiple groups of pinhole arrays are arranged on each layer of the pinhole type structure; and a holographic function screen, configured to perform diffusion imaging on the 3D light field information to form a 3D image, wherein the LED display, the light path control structure and the holographic function screen are sequentially configured.

Specifically, in an application scenario of a large-sized display such as an LED display screen, a visual distance of an observer is usually longer than 5 meters, and in addition, a movement range of the observer in a vertical direction is very limited, so that the number of viewpoints being able to be observed in the vertical direction is very small. Under such a condition, it is less significant to increase the number of viewpoints in the vertical direction. By comparison, a movement range of the observer in a horizontal direction is much larger, and the number of viewpoints being able to be observed is much larger, so that it is much more significant to increase the number of viewpoints in the horizontal direction. In view of this, a ratio of a pixel pitch of the LED display to a size of an LED luminous part is larger, that is, a duty ratio of a luminous part of a pixel is smaller, so that the multilayer pinhole type structure capable of accurately controlling the emitting directions of the light paths and including the multiple groups of pinhole arrays may be used, wherein the multilayer pinhole type structure includes the multiple groups of pinhole arrays, and the multiple groups of pinhole arrays form a large array. The multiple groups of pinhole arrays may regularly and sequentially arrange and distribute, in the horizontal direction, lights emitted by pixels in light field display units obtained by dividing the image displayed by the LED display, and mutual crosstalk is low enough. That is, light information contained by different pixels may be effectively demodulated to obtain a light field as a signal-to-noise ratio between the light information is small enough. Such a process is actually a process of applying LED pixels in the vertical direction to horizontal viewpoint construction on a large scale. The light field formed like this not only implements formation of many viewpoints of a horizontal light field, but also meets a low-crosstalk condition, thereby implementing a horizontal light field with an ultrahigh resolution and an obvious horizontal parallax and finally achieving a remarkable 3D light field display effect. At the same time of utilizing the multilayer pinhole type structure, the multilayer pinhole type structure may be placed at a position very close to the LED display screen on the basis of a high light control capability of the structure to obtain a large field angle and further eliminate a watching feeling of unreality caused by frequent jump of a visual area.

Specifically, the holographic function screen is arranged in front of the light path control structure with the multilayer pinhole type structure, and has a specific-angle diffusion capability for the light field in a specific direction. The holographic function screen has the functions of further multiplexing the light field information to improve a monocular resolution and performing secondary optical parallel demodulation processing on the light field information emitted by the multilayer pinhole type structure to rapidly image the 3D light field information and further assist in imaging of human eyes.

In some embodiments of the disclosure, the emitting directions of the light paths of the image are controlled to form the 3D light field information through the light path control structure including the multilayer pinhole type structure, and diffusion imaging is performed on the 3D light field information to form the 3D image through the holographic function screen. The light path control structure with the multilayer pinhole type structure including the multiple groups of pinhole arrays is able to accurately control the emitting directions of the light paths, and a formed light field not only implements formation of many viewpoints of a horizontal light field, but also meets a low-crosstalk condition, thereby implementing a horizontal light field with an ultrahigh resolution and an obvious horizontal parallax and finally achieving a remarkable 3D light field display effect. The holographic function screen is able to further multiplex the light field information to improve a monocular resolution, and perform secondary optical parallel demodulation processing on the light field information emitted by the multilayer pinhole type structure to rapidly image the 3D light field information and further assist in imaging of human eyes. A feeling of depth of the 3D image is further improved, so that a better 3D effect is achieved, a 3D display purpose is achieved, a real 3D light field display effect with many viewpoints, an ultrahigh resolution, low crosstalk and a large field angle is achieved, a watcher is not required to wear any piece of visual aid, and may watch for a long time without feeling tired and dizzy, and the 3D effect, the feeling of depth and an immersive effect are remarkably improved. Therefore, a watching experience is greatly improved, and the technical problems of poor 3D effects in the related art are further solved.

Figure 4:
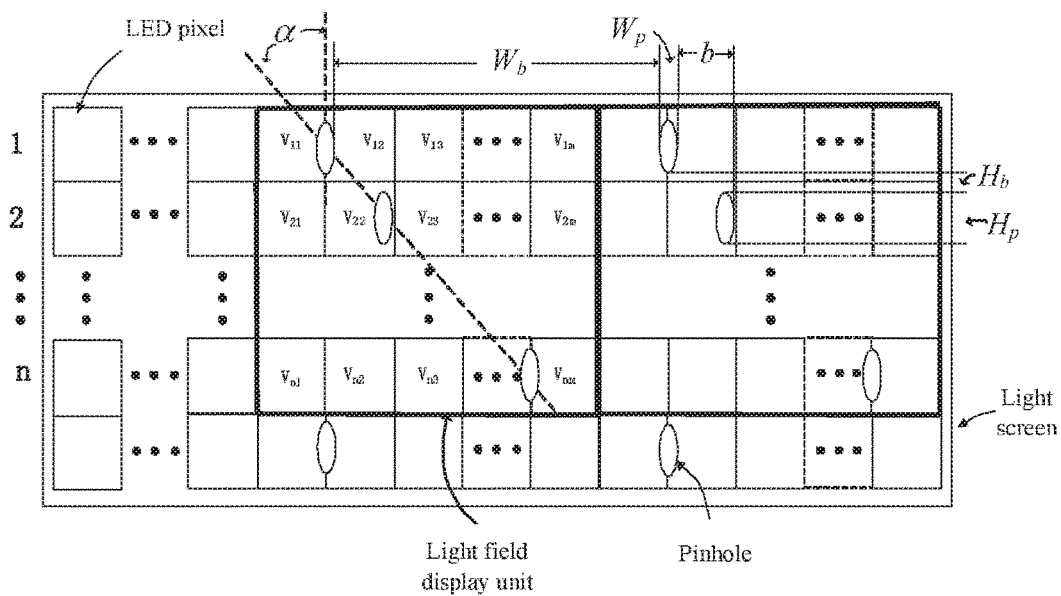
FIG. 4 is a schematic diagram of superimposing a pinhole type structure and light field display units according to an embodiment of the disclosure.

In an optional embodiment, as shown in FIG. 4, the pinhole type structure is a light screen, the multiple groups of pinhole arrays are arranged on the light screen, and each group of pinhole array includes multiple pinholes; and the image includes multiple light field display units, each light field display unit includes multiple rows of LED pixels and multiple columns of LED pixels, and each light field display unit corresponds to a pinhole array. The number of the pinholes in the pinhole arrays will not be limited in the disclosure, and may be self-defined according to a practical requirement. The number of the pinholes in the pinhole arrays shown in FIG. 4 is the same as a row number of the LED pixels in the light field display units. It is important to note here that only an example is given in FIG. 4, and during a practical application, the number of the pinholes in the pinhole arrays may be more than the row number of the LED pixels in the light field display units.

Figure 5:
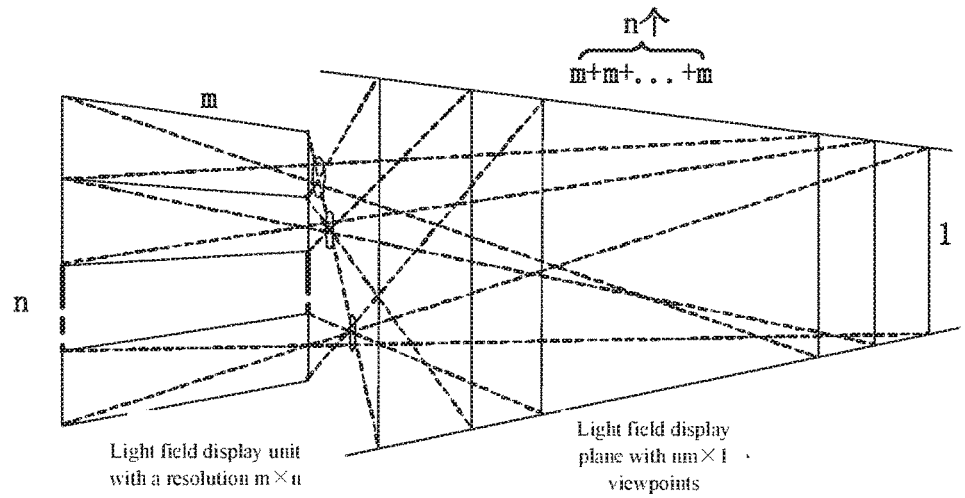
FIG. 5 is a schematic diagram of forming a spatial light field for display by a 3D display device according to an embodiment of the disclosure.

Specifically, FIG. 4 is a schematic diagram of superimposing an image displayed by an LED display and a light path control structure. In FIG. 4, each group of pinholes arranged in a slash on the light screens is a pinhole array, the image displayed by the LED display may be divided into multiple light field display units, shown in larger black boxes in FIG. 4, smaller boxes in FIG. 5 are the LED pixels in the image, each light field display unit includes multiple rows and multiple columns of LED pixels, and each light field display unit corresponds to multiple pinholes, not one pinhole in the related art.

Specifically, the pinhole arrays on the light screens are opened according to a specific parameter, as to control a single light field display unit to be taken as a repeating period, wherein a pinhole structure of each pinhole refers to an open hole which is small enough.

In an optional embodiment, as shown in FIG. 4, all the pinholes in the pinhole arrays are arranged in a slash.

Specifically, as shown in FIG. 4, all the pinholes in the pinhole arrays are arranged in the slash. Under the condition that the pinholes are small enough and the pinhole arrays are dense enough, the pinhole arrays are approximate to oblique gaps when being viewed with eyes, that is, many oblique gaps are distributed in the light screens. The pinhole arrays which are arranged in the slash may regularly and sequentially arrange and distribute, in the horizontal direction, the lights emitted by the pixels in the light field display units, and mutual crosstalk is low enough. That is, the light information contained by different pixels may be effectively demodulated to obtain the light field, as the signal-to-noise ratio between the light information is small enough. The LED pixels in the vertical direction are applied to horizontal viewpoint construction on a large scale, and then the light field formed like this not only implements formation of many viewpoints of the horizontal light field, but also meets the low-crosstalk condition, thereby implementing the horizontal light field with the ultrahigh resolution and the obvious horizontal parallax and finally achieving the remarkable 3D light field display effect.

In an optional embodiment, the shapes of the pinholes include ellipses, rounds or rectangles, and the shapes of the pinholes in FIG. 4 are ellipse.

In an optional embodiment, when the shape of the pinhole is an ellipse, a parameter of the light path control structure is designed as follows.

As shown in FIG. 4, two key parameters of the multilayer pinhole type structure include a horizontal open hole size $W_p$ and vertical open hole size $H_p$ of the pinhole, wherein the resolution of a light field display unit is m×n, and Vnm represents the LED pixel in the nth row and mth column in the light field display unit; a pitch of the multilayer pinhole type structure is equal to the horizontal resolution m of the light field display unit; a horizontal distance between two pinholes in the same row in two adjacent pinhole arrays is $W_b$; a vertical distance between two adjacent pinholes in the pinhole array is $H_b$, a horizontal distance is b, and an included angle between the vertical direction and the slash formed by all the pinholes in the pinhole array is α; and values of a length and width of the LED pixel are both p.

A schematic diagram of a spatial light field formed by the light field display units through the multilayer pinhole type structure is shown in FIG. 5. The number of viewpoints of the light field finally formed by a sub-image array formed by the light field display units with the resolution m×n is mn×1, that is, m×n viewpoints form spatial horizontal light field information, and one viewpoint forms spatial vertical light field information. In other words, such a technology may apply all of the formed viewpoints to the horizontal direction, thereby completely presenting information of each angle of an object image in the horizontal direction to achieve a remarkable horizontal parallax real 3D display effect. The number of the horizontal viewpoints formed by the technology is n times the number of horizontal viewpoints formed by a current light field display technology, so that the 3D effect is remarkably enhanced.

Formula description and deduction resolving will be performed on related parameters which are involved below.

Parameter design related to the horizontal direction:

The pitch between two layers of the multilayer pinhole type structure is m, so that:

$$W_b + W_p = mp \quad (1).$$

Figure 6:
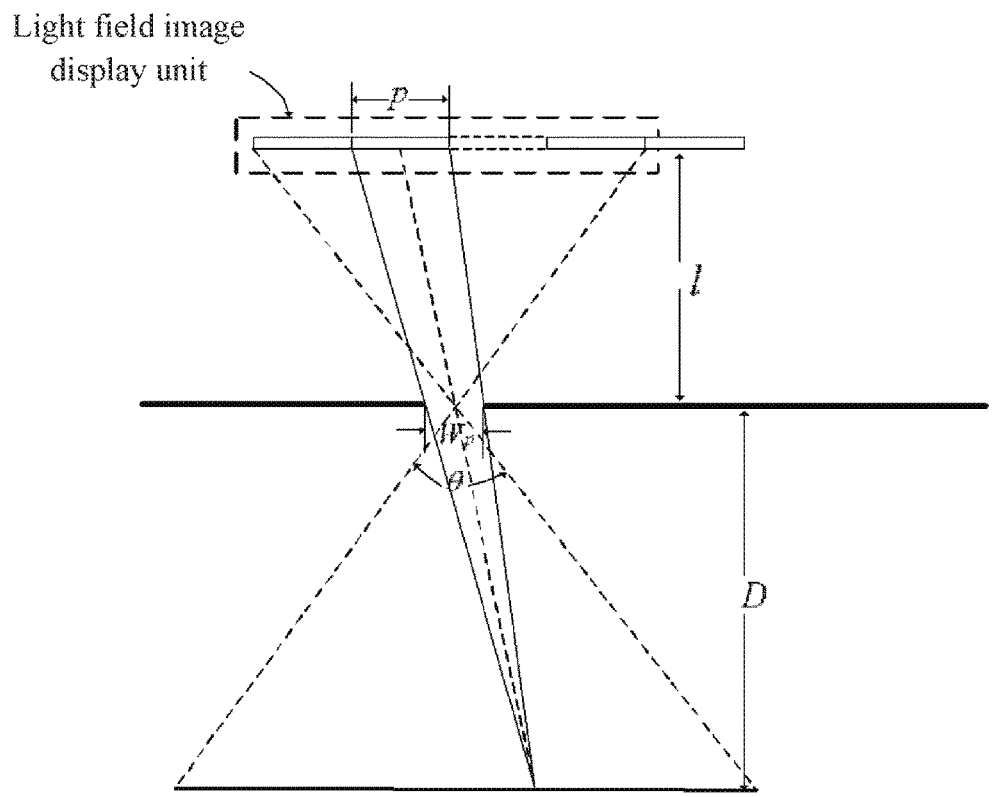
FIG. 6 is a schematic diagram of light paths of a light field in a horizontal direction of a 3D display device according to an embodiment of the disclosure.

As shown in FIG. 6, a light field image display unit in FIG. 6 is a light field display unit, it is set that a distance between the LED display screen and the pinhole type structure is l, a distance between a watching plane and the pinhole type structure is D and a duty ratio of the horizontal direction of a luminous part in the LED pixel is $\varepsilon_h$, and considering a ratio of a physical size of the luminous part to a physical size of a non-luminous part, a schematic diagram of light paths of the light field in the horizontal direction in FIG. 6 is:

$$\frac{W_p}{\varepsilon_h \cdot p} = \frac{D}{D+l}. \quad (2)$$

When it is set that a field angle of the light field in the horizontal direction is θ, the following formula is true:

$$\frac{mp}{2l} = \tan\left(\frac{\theta}{2}\right). \quad (3)$$

From (1) and (2):

$$W_p = \frac{D}{D+l} \cdot \varepsilon_h \cdot p, \text{ and} \quad (4)$$

$$W_b = \left(m - \frac{D}{D+l} \cdot \varepsilon_h\right) p. \quad (5)$$

Parameters involved in the vertical direction:

It is set that a duty ratio of the vertical direction of the luminous part in the LED pixel is $\varepsilon_v$, and the design parameters in the vertical direction are:

$$H_b + H_p = p \quad (7), \text{ and}$$

$$H_p = \varepsilon_v \cdot p \quad (8).$$

Optionally, since light transmittance of the multilayer pinhole type structure is required to be considered, $H_p$ and $H_b$ may also be designed to be P and 0 respectively. However, light control accuracy of the structure may be reduced when this group of parameters is utilized.

Other Parameters:

The included angle α between the vertical direction and the slash formed by all the pinholes in the pinhole array may be described as follows:

$$\tan\alpha = \frac{b}{p}. \quad (9)$$

From the above, the parameters involved in the light path control structure are summarized in the following table.

| Item | Parameter | Design method |
|---|---|---|
| Equipment parameter | p | Determined by the LED display |
|  | $\varepsilon_h$ | Determined by the LED display |
|  | $\varepsilon_v$ | Determined by the LED display |
| Determined early | α | Fitted within $0 \square \frac{\pi}{2}$ |
|  | Resolution m × n of the light field display unit | Obtained by early system testing and a coding algorithm |
|  | θ | Early preset index |
|  | D | Early preset index |
| Obtained by deduction | b | Obtained by deduction with formula (9) |
|  | $W_p$ | Obtained by deduction with formula (4) |
|  | $W_b$ | Obtained by deduction with formula (1) |
|  | $H_p$ | Obtained by deduction with formula (8) |
|  | $H_b$ | Obtained by deduction with formula (7) |
|  | l | Obtained by deduction with formula (3) |

In an optional embodiment, parameter design of the holographic function screen is as follows.

Figure 7:
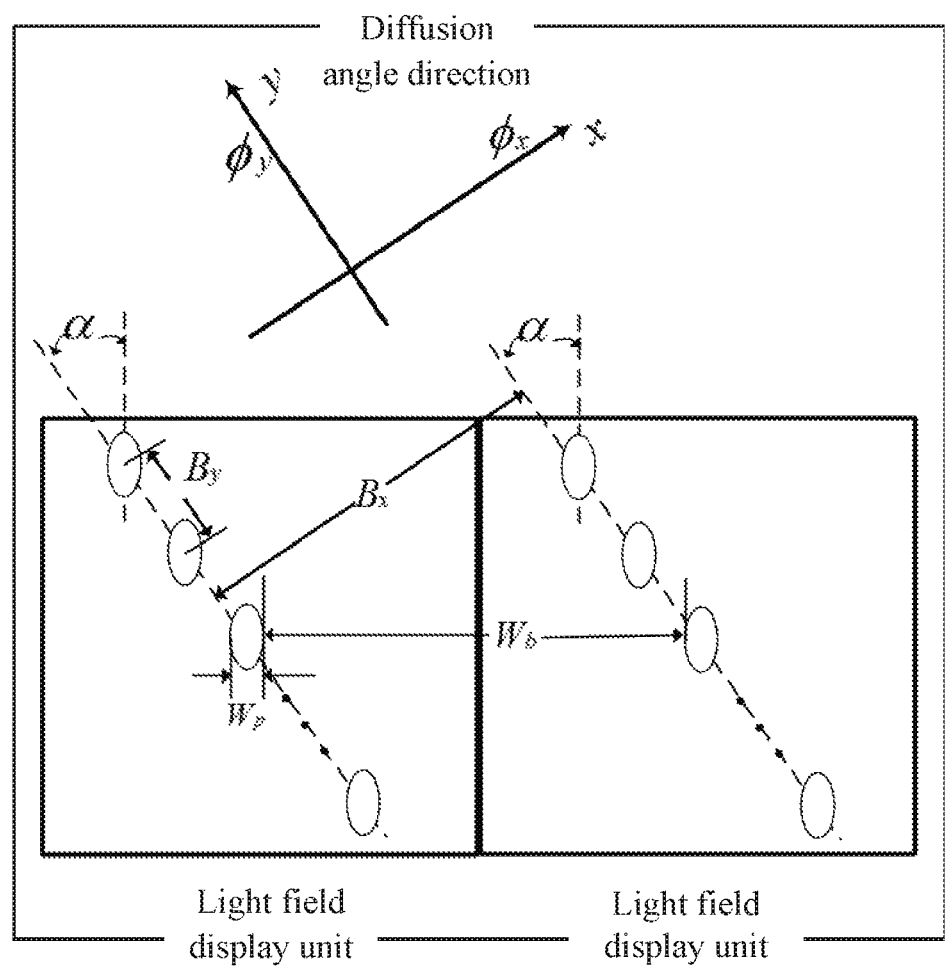
FIG. 7 is a schematic diagram of direction-selective diffusion of a holographic function screen according to an embodiment of the disclosure.

According to a pinhole arrangement rule of the multilayer pinhole type structure, it is necessary to perform light diffusion on x and y directions shown in FIG. 7. It is set that a diffusance in the x and y directions of the holographic function screen is $\phi_x$ and $\phi_y$ respectively and a distance between the holographic function screen and the multilayer pinhole type structure is d.

Design of $\phi_x$ is related to $B_x$, and according to FIG. 7:

$$B_x = (W_b + W_p) \cdot \cos \alpha \quad (10).$$

Figure 8:
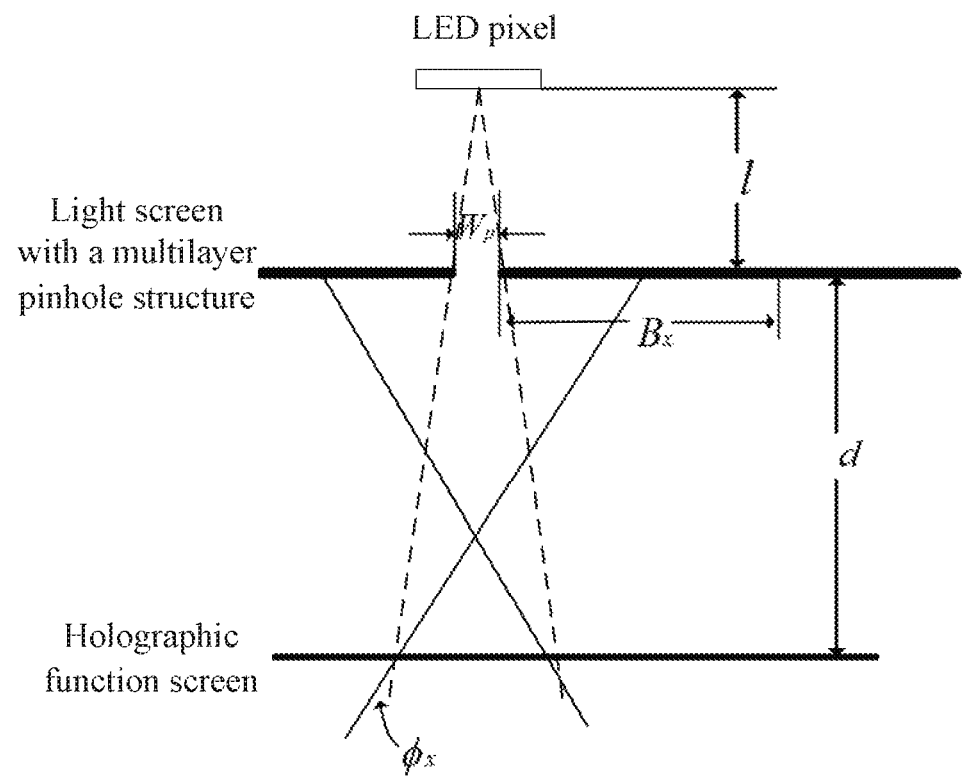
FIG. 8 is a schematic diagram of light paths of a light field after a holographic function screen is used in an x direction according to an embodiment of the disclosure.

As shown in FIG. 8, the visual area after single-point light diffusion covers $B_x$, and because d□l□p and $B_x \square W_p$ during practical design, according to the light paths in FIG. 8:

$$\phi_x = \tan\left(\frac{B_x}{2d}\right). \quad (11)$$

For $\phi_y$, a calculation principle is the same as $\phi_x$, $\phi_y$ is related to $B_y$, and:

$$B_y = \frac{(H_b + H_p)}{\cos\alpha}, \text{ and} \quad (12)$$

$$\phi_y = \tan\left(\frac{B_y}{2d}\right). \quad (13)$$

The holographic function screen may further improve the feeling of depth of the 3D image, thereby achieving a better 3D effect, and an improvement degree is positively related to the distance d between the holographic function screen and the multilayer pinhole type structure. However, in addition, d is negatively related to a diffusance of a directional scattering film. That is, a higher diffusance may provide a larger visual field angle and a higher monocular resolution, but also weakens the feeling of depth of the 3D image and increases the crosstalk. Therefore, the two are balanced according to a requirement of a practical application scenario during parameter design.

Embodiment 2

According to some embodiments of the disclosure, a method embodiment of a 3D display method is provided. It is important to note that the steps shown in the flowchart of the drawings may be executed in a computer system, such as a group of computers, capable of executing instructions, and moreover, although a logical sequence is shown in the flowchart, the shown or described steps may be executed in a sequence different from that described here.

Figure 9:
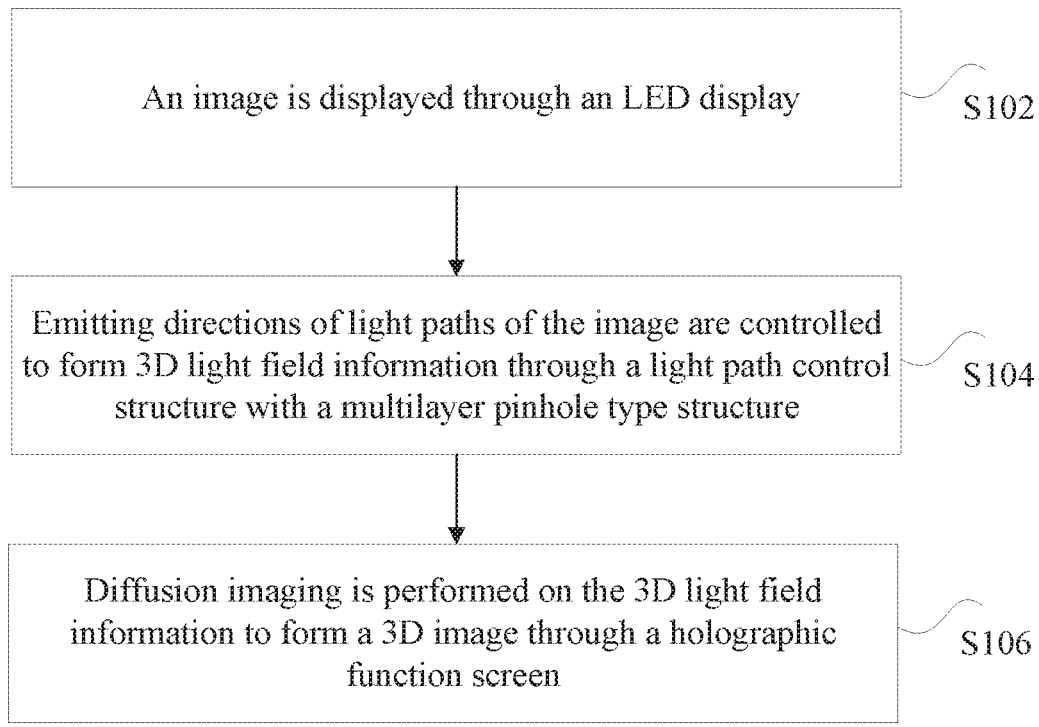
FIG. 9 is a schematic diagram of a 3D display method according to an embodiment of the disclosure.

FIG. 9 is a 3D display method according to an embodiment of the disclosure. The method is applied to the abovementioned 3D display device, and as shown in FIG. 9, includes the following steps.

In Step S102, an image is displayed through an LED display.

In Step S104, emitting directions of light paths of the image are controlled to form 3D light field information through a light path control structure with a multilayer pinhole type structure, wherein multiple groups of pinhole arrays are arranged on each layer of the pinhole type structure.

In Step S106: diffusion imaging is performed on the 3D light field information to form a 3D image through a holographic function screen.

Sequence numbers of the embodiments of the disclosure are only adopted for description, and do not represent quality of the embodiments.

In the abovementioned embodiments of the disclosure, each embodiment is described with different emphases, and parts which are not elaborated in a certain embodiment may refer to related descriptions of the other embodiments.

In some embodiments provided by the disclosure, it should be understood that the disclosed technical content may be implemented in another manner, wherein the device embodiment described above is only schematic, and for example, division of the units may be logic function division, and other division manners may be adopted during practical implementation. For example, multiple units or components may be combined or integrated into another system, or some characteristics may be neglected or not executed. In addition, coupling or direct coupling or communication connection between the displayed or discussed components may be indirect coupling or communication connection, implemented through some interfaces, of the units or the modules, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the disclosure according to a practical requirement.

In addition, each function unit in each embodiment of the disclosure may be integrated into a processing unit, each unit may also exist independently, and two or more than two unit may also be integrated into a unit. The abovementioned integrated unit may be implemented in a hardware form, and may also be implemented in form of software function unit.

When being implemented in form of software function unit and sold or used as an independent product, the integrated unit may also be stored in a computer-readable storage medium. Based on such an understanding, the technical solutions of the disclosure substantially or parts making contributions to the related art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a Read-Only Memory (ROM), a Random Access Memory (RAM), a mobile hard disk, a magnetic disk or an optical disk.

The above describes only some embodiments of the disclosure. It should be pointed out that those skilled in the art may further make a plurality of improvements and embellishments without departing from the principle of the disclosure, and these improvements and embellishments shall also fall within the scope of protection of the disclosure.

Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:
1. A Three-Dimensional (3D) display device, comprising:
a Light-Emitting Diode (LED) display, configured to display an image;
a light path control structure comprising a multilayer pinhole type structure, configured to control emitting directions of light paths of the image to form 3D light field information, wherein multiple groups of pinhole arrays are arranged on each layer of the pinhole type structure; and
a holographic function screen, configured to perform diffusion imaging on the 3D light field information to form a 3D image;
wherein the LED display, the light path control structure and the holographic function screen are sequentially configured,
wherein the pinhole type structure comprises a light screen, the multiple groups of pinhole arrays are arranged on the light screen, and each group of pinhole array comprises multiple pinholes,
wherein the image comprises multiple light field display units, each light field display unit comprises multiple rows of LED pixels and multiple columns of LED pixels, and each light field display unit corresponds to a pinhole array,
wherein all pinholes in the pinhole arrays are arranged in a slash, and wherein a parameter of the light path control structure comprises:

$$\tan\alpha = \frac{b}{p},$$

where α represents an included angle between a vertical direction and the slash formed by all the pinholes in the pinhole array, b represents a horizontal distance between two adjacent pinholes in the pinhole arrays, and p represents values of a length and width of the LED pixel in the light field display unit.

2. The device as claimed in claim 1, wherein, when a shape of a pinhole is an ellipse, a parameter of the light path control structure comprises:

$$W_p = \frac{D}{D+l} \cdot \varepsilon_h \cdot p, \text{ and}$$

$$W_b = \left(m - \frac{D}{D+l} \cdot \varepsilon_h\right)p,$$

where $W_p$ represents a horizontal open hole size of the pinhole, $W_b$ represents a horizontal distance between two pinholes in a same row in two adjacent pinhole arrays, D represents a distance between a watching plane and the pinhole type structure, l represents a distance between an LED display screen and the pinhole type structure, $\varepsilon_h$ represents a duty ratio of a horizontal direction of a luminous part in the LED pixel in the light field display unit, p represents values of a length and width of the LED pixel in the light field display unit, and m represents a pitch between two layers of the multilayer pinhole type structure.

3. The device as claimed in claim 2, wherein a shape of the pinhole is an ellipse, a round or a rectangle.

4. A Three-Dimensional (3D) display method, applied to the 3D display device as claimed in claim 2 and comprising:
 displaying an image by a Light-Emitting Diode (LED) display;
 controlling emitting directions of light paths of the image to form 3D light field information through a light path control structure with a multilayer pinhole type structure, wherein multiple groups of pinhole arrays are arranged on each layer of the pinhole type structure; and
 performing diffusion imaging on the 3D light field information to form a 3D image by a holographic function screen.

5. The device as claimed in claim 1, wherein a parameter of the light path control structure comprises:

$H_b + H_p = p,$ and $H_p = \varepsilon_v \cdot p,$ where $H_b$ represents a vertical distance between two adjacent pinholes in the pinhole arrays, $H_p$ represents a vertical open hole size of the pinhole, $\varepsilon_v$ represents a duty ratio of a vertical direction of the luminous part in the LED pixel in the light field display unit, and p represents values of a length and width of the LED pixel in the light field display unit.

6. The device as claimed in claim 5, wherein a shape of the pinhole is an ellipse, a round or a rectangle.

7. A Three-Dimensional (3D) display method, applied to the 3D display device as claimed in claim 5 and comprising:
 displaying an image by a Light-Emitting Diode (LED) display;
 controlling emitting directions of light paths of the image to form 3D light field information through a light path control structure with a multilayer pinhole type structure, wherein multiple groups of pinhole arrays are arranged on each layer of the pinhole type structure; and
 performing diffusion imaging on the 3D light field information to form a 3D image by a holographic function screen.

8. The device as claimed in claim 1, wherein a parameter of the light path control structure comprises:

$H_b = 0,$ and $H_p = p,$ where $H_b$ represents a vertical distance between two adjacent pinholes in the pinhole arrays, $H_p$ represents a vertical open hole size of the pinhole, and p represents values of a length and width of the LED pixel in the light field display unit.

9. The device as claimed in claim 8, wherein a shape of the pinhole is an ellipse, a round or a rectangle.

10. The device as claimed in claim 1, wherein a parameter of the holographic function screen comprises:

$$\phi_x = \tan\left(\frac{B_x}{2d}\right), \text{ and}$$

$$\phi_y = \tan\left(\frac{B_y}{2d}\right),$$

where $B_x = (W_b + W_p) \cdot \cos\alpha,$ $$B_y = \frac{(H_b + H_p)}{\cos\alpha},$$

$\phi_x$ represents a diffusance of the holographic function screen in an x direction, $\phi_y$ represents a diffusance of the holographic function screen in a y direction, d represents a distance between the holographic function screen and the light path control structure, $W_p$ represents a horizontal open hole size of the pinhole, $W_b$ represents a horizontal distance between two pinholes in a same row in two adjacent pinhole arrays, $H_b$ represents a vertical distance between two adjacent pinholes in the pinhole arrays, $H_p$ represents a vertical open hole size of the pinhole, and α represents a included angle between a vertical direction and the slash formed by all the pinholes in the pinhole array.

11. The device as claimed in claim 10, wherein a shape of the pinhole is an ellipse, a round or a rectangle.

12. The device as claimed in claim 1, wherein a shape of the pinhole is an ellipse, a round or a rectangle.

13. A Three-Dimensional (3D) display method, applied to the 3D display device as claimed in claim 1 and comprising:
 displaying an image by a Light-Emitting Diode (LED) display;
 controlling emitting directions of light paths of the image to form 3D light field information through a light path control structure with a multilayer pinhole type structure, wherein multiple groups of pinhole arrays are arranged on each layer of the pinhole type structure; and performing diffusion imaging on the 3D light field information to form a 3D image by a holographic function screen, wherein the pinhole type structure comprises a light screen, the multiple groups of pinhole arrays are arranged on the light screen, and each group of pinhole array comprises multiple pinholes, wherein the image comprises multiple light field display units, each light field display unit comprises multiple rows of LED pixels and multiple columns of LED pixels, and each light field display unit corresponds to a pinhole array, wherein all pinholes in the pinhole arrays are arranged in a slash, and wherein a parameter of the light path control structure comprises:

$$\tan\alpha = \frac{b}{p},$$

where α represents an included angle between a vertical direction and the slash formed by all the pinholes in the pinhole array, b represents a horizontal distance between two adjacent pinholes in the pinhole arrays, and p represents values of a length and width of the LED pixel in the light field display unit.

\* \* \* \* \*